United States Patent
Groves, II et al.

(10) Patent No.: US 10,724,380 B2
(45) Date of Patent: Jul. 28, 2020

(54) CMC BLADE WITH INTERNAL SUPPORT

(71) Applicant: General Electric Company, Schenectady, NY (US)

(72) Inventors: Robert Charles Groves, II, West Chester, OH (US); Ronald Scott Bunker, Placitas, NM (US)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 15/670,291

(22) Filed: Aug. 7, 2017

(65) Prior Publication Data

US 2019/0040746 A1 Feb. 7, 2019

(51) Int. Cl.
| | | |
|---|---|---|
| *F01D 5/18* | (2006.01) | |
| *F01D 5/30* | (2006.01) | |
| *F01D 5/28* | (2006.01) | |
| *F01D 11/10* | (2006.01) | |
| *F01D 5/14* | (2006.01) | |
| *F01D 5/22* | (2006.01) | |

(52) U.S. Cl.
CPC ............ *F01D 5/186* (2013.01); *F01D 5/147* (2013.01); *F01D 5/187* (2013.01); *F01D 5/282* (2013.01); *F01D 5/284* (2013.01); *F01D 5/30* (2013.01); *F01D 11/10* (2013.01); *F01D 5/225* (2013.01); *F05D 2260/30* (2013.01); *F05D 2260/36* (2013.01); *F05D 2300/6033* (2013.01)

(58) Field of Classification Search
CPC .......... F01D 5/186; F01D 5/147; F01D 11/10; F01D 5/284; F01D 5/187; F01D 5/282; F01D 5/30; F01D 5/225; F01D 5/18; F05D 2260/36; F05D 2300/6033; F05D 2260/30
USPC ........................................................ 415/115
See application file for complete search history.

(56) References Cited

U.S. PATENT DOCUMENTS

| | | | | |
|---|---|---|---|---|
| 2,807,433 A | * | 9/1957 | Halford ................... | F01D 5/188 415/115 |
| 2,825,530 A | * | 3/1958 | Schum .................... | F01D 5/187 416/248 |
| 2,906,495 A | * | 9/1959 | Schum .................... | F01D 5/188 416/219 R |
| 2,974,926 A | * | 3/1961 | Thompson, Jr. ........ | F01D 5/187 416/92 |
| 3,171,631 A | * | 3/1965 | Aspinwall ............... | F01D 5/187 416/233 |
| 3,378,228 A | * | 4/1968 | Davics ..................... | F01D 5/18 415/217.1 |

(Continued)

*Primary Examiner* — J. Todd Newton
(74) *Attorney, Agent, or Firm* — McGarry Bair PC

(57) ABSTRACT

A gas turbine engine turbine blade includes internal structural support radially supporting aerodynamic fairing. Strut radially extends away from root of support. Fairing includes hollow fairing airfoil surrounding strut and extending from fairing platform to blade tip shroud at tip of the fairing airfoil. A support cap attached to radially outer end of strut outwardly restrains fairing. Seal teeth may extend outwardly from the support cap. Internal cooling air flow path may extend radially through support. Fairing may be made from material lighter in weight than the support. Fairing material may be ceramic matrix composite and support material may be metallic. Blades may be mounted in rim of disk by roots disposed in slots through rim. Annular plate mounted to, upstream of, and proximate web of disk defines in part cooling airflow path to slot.

20 Claims, 6 Drawing Sheets

(56) References Cited

U.S. PATENT DOCUMENTS

| | | | | |
|---|---|---|---|---|
| 3,443,792 A * | 5/1969 | Moss | F01D 5/187 | 416/92 |
| 3,694,104 A * | 9/1972 | Erwin | F01D 5/147 | 416/215 |
| 3,741,681 A * | 6/1973 | De Witt | F01D 5/081 | 416/193 A |
| 4,017,209 A * | 4/1977 | Bodman | F01D 5/187 | 416/190 |
| 4,247,259 A * | 1/1981 | Saboe | B23P 15/04 | 29/889.71 |
| 4,252,501 A * | 2/1981 | Peill | F01D 5/189 | 415/115 |
| 4,288,201 A * | 9/1981 | Wilson | F01D 5/189 | 415/115 |
| 4,314,794 A * | 2/1982 | Holden | F01D 5/182 | 416/225 |
| 4,376,004 A * | 3/1983 | Bratton | F01D 5/184 | 156/89.27 |
| 4,473,336 A * | 9/1984 | Coney | B23P 15/04 | 416/223 A |
| 4,480,956 A * | 11/1984 | Kruger | F01D 5/14 | 415/173.4 |
| 4,519,745 A * | 5/1985 | Rosman | F01D 5/284 | 416/241 B |
| 4,563,125 A * | 1/1986 | Boudigues | F01D 5/18 | 415/115 |
| 4,563,128 A * | 1/1986 | Rossmann | F01D 5/284 | 416/92 |
| 4,645,421 A * | 2/1987 | Huether | F01D 5/3084 | 416/241 B |
| 4,790,721 A * | 12/1988 | Morris | F01D 5/187 | 416/241 B |
| 4,832,568 A * | 5/1989 | Roth | F01D 9/042 | 415/189 |
| 6,254,345 B1 | 7/2001 | Harris et al. | | |
| 6,464,456 B2 * | 10/2002 | Darolia | F01D 5/3084 | 415/134 |
| 6,648,597 B1 * | 11/2003 | Widrig | C04B 37/001 | 415/200 |
| 6,884,030 B2 * | 4/2005 | Darkins, Jr. | F01D 9/042 | 29/889.22 |
| 6,905,301 B2 * | 6/2005 | Tiemann | F01D 5/189 | 415/115 |
| 7,093,359 B2 * | 8/2006 | Morrison | F01D 5/282 | 264/257 |
| 7,094,021 B2 | 8/2006 | Haubert | | |
| 7,104,756 B2 * | 9/2006 | Harding | F01D 5/189 | 416/233 |
| 7,326,030 B2 * | 2/2008 | Albrecht | F01D 5/147 | 415/115 |
| 7,648,336 B2 * | 1/2010 | Cairo | F01D 9/042 | 415/209.4 |
| 7,713,029 B1 * | 5/2010 | Davies | F01D 5/025 | 416/204 R |
| 7,736,131 B1 * | 6/2010 | Wilson, Jr. | B82Y 30/00 | 416/226 |
| 7,789,621 B2 * | 9/2010 | Dierksmeier | F01D 5/147 | 415/191 |
| 7,866,950 B1 * | 1/2011 | Wilson, Jr. | F01D 5/147 | 416/193 A |
| 7,967,565 B1 * | 6/2011 | Kimmel | F01D 5/147 | 416/224 |
| 8,100,653 B2 * | 1/2012 | Gerakis | F01D 5/147 | 416/97 R |
| 8,142,163 B1 * | 3/2012 | Davies | F01D 5/147 | 416/225 |
| 8,162,617 B1 * | 4/2012 | Davies | F01D 5/147 | 416/223 R |
| 8,182,224 B1 * | 5/2012 | Liang | F01D 5/186 | 416/97 A |
| 8,186,953 B1 * | 5/2012 | Kimmel | F01D 5/187 | 416/97 R |
| 8,251,658 B1 * | 8/2012 | Diggs | F01D 5/147 | 416/226 |
| 8,292,580 B2 * | 10/2012 | Schiavo | F01D 5/189 | 416/229 A |
| 8,444,389 B1 * | 5/2013 | Jones | F01D 5/14 | 416/193 A |
| 8,475,132 B2 * | 7/2013 | Zhang | F01D 5/147 | 416/225 |
| 8,678,764 B1 * | 3/2014 | Kimmel | F01D 5/20 | 416/228 |
| 8,926,262 B2 | 1/2015 | Tanahashi et al. | | |
| 9,045,990 B2 | 6/2015 | Alvanos et al. | | |
| 9,068,464 B2 * | 6/2015 | Morrison | F01D 5/282 | |
| 9,394,795 B1 * | 7/2016 | Kimmel | F01D 5/147 | |
| 9,506,350 B1 * | 11/2016 | Memmen | F01D 5/147 | |
| 9,915,151 B2 * | 3/2018 | Weaver | F01D 5/188 | |
| 9,970,317 B2 * | 5/2018 | Freeman | F01D 25/005 | |
| 2005/0079058 A1 | 4/2005 | Paquet et al. | | |
| 2006/0120869 A1 | 6/2006 | Wilson | F01D 5/147 | 416/97 R |
| 2007/0258811 A1 * | 11/2007 | Shi | F01D 5/147 | 415/210.1 |
| 2009/0003993 A1 * | 1/2009 | Prill | F01D 5/284 | 415/134 |
| 2009/0169395 A1 * | 7/2009 | Wilson, Jr. | F01D 5/28 | 416/97 R |
| 2010/0021290 A1 * | 1/2010 | Schaff | F01D 5/147 | 415/200 |
| 2010/0080687 A1 * | 4/2010 | Vance | F01D 5/147 | 415/115 |
| 2012/0297790 A1 * | 11/2012 | Alvanos | F01D 5/282 | 60/796 |
| 2012/0301275 A1 | 11/2012 | Suciu et al. | | |
| 2013/0067930 A1 * | 3/2013 | Paradis | F01D 25/243 | 60/796 |
| 2013/0171426 A1 | 7/2013 | de Diego et al. | | |
| 2014/0023506 A1 | 1/2014 | Kleinow | | |
| 2016/0123163 A1 * | 5/2016 | Freeman | F01D 25/005 | 415/200 |
| 2016/0123164 A1 * | 5/2016 | Freeman | F01D 25/005 | 415/200 |
| 2016/0201487 A1 * | 7/2016 | Spangler | F01D 9/041 | 415/115 |
| 2016/0265362 A1 * | 9/2016 | Slavens | B22F 5/04 | |
| 2017/0002661 A1 | 1/2017 | Opderbecke et al. | | |
| 2017/0101880 A1 * | 4/2017 | Thomas | F01D 11/005 | |
| 2017/0234144 A1 * | 8/2017 | Mugglestone | F01D 5/188 | 415/178 |
| 2017/0254207 A1 * | 9/2017 | Schetzel | F01D 5/284 | |
| 2017/0320232 A1 * | 11/2017 | de Diego | C04B 35/76 | |
| 2018/0038237 A1 * | 2/2018 | Banks | F01D 9/02 | |
| 2018/0355730 A1 * | 12/2018 | Dutta | F01D 11/04 | |
| 2019/0040746 A1 * | 2/2019 | Groves, II | F01D 5/186 | |
| 2019/0345833 A1 * | 11/2019 | Thornton | F01D 9/041 | |

\* cited by examiner

CMC BLADE WITH INTERNAL SUPPORT

BACKGROUND OF THE INVENTION

Field of the Invention

The invention relates to aircraft gas turbine engine CMC blades and, more particularly, to CMC turbine blades with tip shrouds.

Description of Related Art

Gas turbine engines typically include a core having a high pressure compressor, combustor, and high pressure turbine in downstream serial flow relationship. The high pressure compressor and combustor are operable to generate a hot gas flow into the high pressure turbine. The high pressure turbine includes annular rows of vanes that direct the gases exiting the combustor into downstream, rotating turbine blades. It is well known to cool the turbine blades.

Bleed air from the compressor is used to cool the turbine rotor blades such as by flowing the bleed airs through at least one cooling passage defined within the turbine rotor blade. The cooling passage generally extends from a root portion of the turbine rotor blade to a blade tip of the turbine rotor blade along a radial direction. Further, when the bleed air exits the cooling passage through outlets formed on the turbine rotor blade, the bleed air mixes with the hot gas. Thus, the bleed air may not be used to cool other components within the turbine.

Gas turbine engines frequently employ tip shrouds on individual turbine blade airfoils to limit blade amplitudes when vibrating in a random manner and to guide fluid flow over the airfoils. Adjacent shrouds abut in the circumferential direction to add mechanical stiffness. Annular seal teeth may extend radially outwardly from the shrouds to engage seal lands to seal the gas flowpath between the tip shrouds and casing surrounding the rotor. The seal lands typically are in the form of a honeycomb covered stator shroud. It is known to use ceramic or ceramic matrix composite (CMC) materials for turbine airfoils. The CMC blade and CMC shroud may be integrated into a single integral monolithic component.

It is known that light-weight, cooled or uncooled, high temperature capability, ceramic matrix composite (CMC) airfoils may be used for turbine blades. Ceramic and ceramic matrix composite (CMC) materials are low strain to failure materials. One ceramic matrix composite material suitable for turbine blades is a SiC—SiC CMC, a silicon infiltrated silicon carbide composite reinforced with coated silicon carbide fibers. CMC's are an attractive alternate material to Nickel based super-alloy low pressure (LPT) blades because of their high temperature capability and light-weight. These characteristics provide opportunities for cooling flow savings as compared to cooled LPT blades. This also provides possible improvement in design optimization of disks which support LPT blades.

Problems posed by CMC turbine blades include low thermal coefficient of expansion, low strain to failure, and relatively poor wear characteristics. The low thermal coefficient of expansion results in smaller growth of the tip shroud in the tangential direction during operation relative to metal blades. Due to the brittle nature and lack of damage tolerance of CMC's compared to metals, the material is very susceptible to chipping, cracking, and impact damage. For these reasons, CMC on CMC contact at the interlock faces of the blade tip shrouds is a design concern. The main concern is loss of material and reduction and possible loss of interlock load. The poor wear characteristics are an issue with regards to the rotating seal teeth cutting the static shroud honeycomb and the relative motion of interlock surfaces on adjacent LPT blade tip shrouds.

Accordingly, it is desirable to have CMC turbine blade and blade tip shroud designs which lower or prevent loss of CMC material during operation and which may provide internal cooling to the CMC turbine blade.

SUMMARY OF THE INVENTION

A gas turbine engine turbine blade includes an internal structural support at least partially radially supporting an aerodynamic fairing, a strut radially extending away from a root of the support, the aerodynamic fairing including a hollow fairing airfoil surrounding the strut, the aerodynamic fairing further including the fairing airfoil extending radially outwardly from a fairing platform to a blade tip shroud at a tip of the fairing airfoil, the root radially inwardly restraining the fairing platform, and a support cap attached to a radially outer end of the strut located radially outwardly of and radially outwardly restraining the aerodynamic fairing.

Seal teeth may extend radially outwardly from the support cap. An internal cooling air flow path may extend radially through the support. The aerodynamic fairing and support may be made of fairing and support materials respectively wherein the fairing material is a lighter weight material than the support material. The fairing material may be a ceramic matrix composite and the support material may be a metallic material.

A turbine rotor assembly may include a plurality of blades mounted in a rim of a disk and each root disposed in a slot extending axially through the rim and radially inwardly restraining the fairing platform. An internal cooling air flow path may extend radially through the support from the slot. An annular forward cooling plate may be mounted to, upstream of, and proximate to a web of the disk and define in part a cooling airflow path to the slot. Seal teeth may extend radially outwardly from the support cap and the support may be configured to allow cooling air to pass through the blade and into a shroud cavity for cooling the blade tip shroud.

A gas turbine engine gas generator including a compressor upstream of a turbine and a combustor disposed therebetween may include the turbine rotor assembly a plurality of turbine blades mounted in a rim of a disk of a turbine rotor assembly in the turbine. The cooling airflow path may be in flow communication with a source of disk cooling air in the compressor and an internal cooling air flow path extending radially through the support from the slot.

BRIEF DESCRIPTION OF THE DRAWINGS

The foregoing aspects and other features of the invention are explained in the following description taken in connection with the accompanying drawings where.

DETAILED DESCRIPTION OF THE INVENTION

Figure 1:
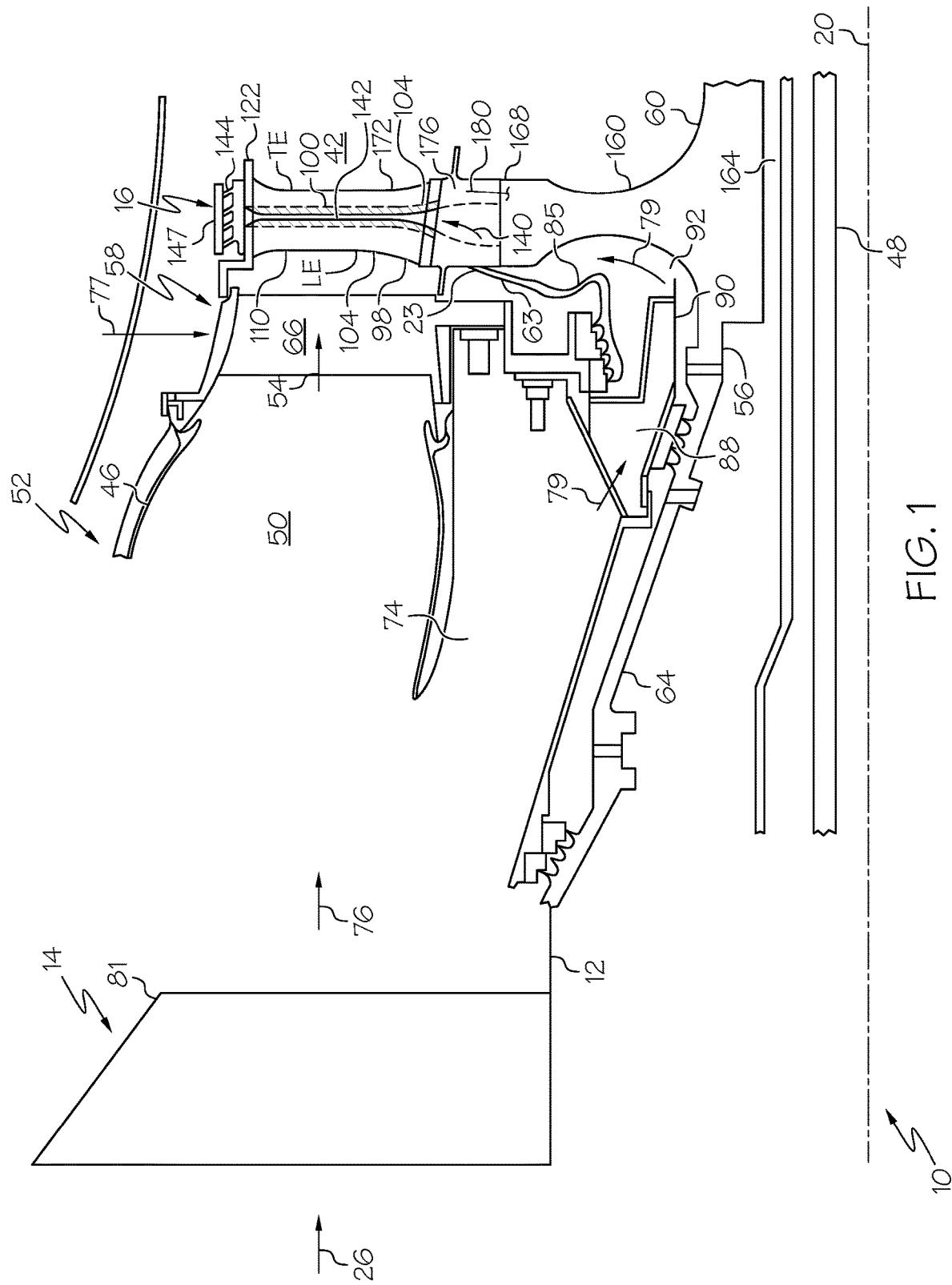
FIG. 1 is a sectional view illustration of a gas generator of a turbine engine having a blade with an internal support.

Illustrated in FIG. 1 is an exemplary gas generator 10 of a gas turbine engine. The gas generator 10 has a gas generator rotor 12 circumscribed about an axis of rotation 20 and includes a compressor 14 and a turbine 16 disposed downstream thereof. A combustor 52 is disposed between the compressor 14 and the turbine 16. Inlet air 26 enters and is compressed by the compressor 14.

The inlet air 26 is compressed by the compressor 14 and exits the compressor as compressor discharge pressure (CDP) air 76 from a compressor discharge pressure source 81. A large portion of the CDP air 76 flows into the combustor 52 where it is mixed with fuel provided by a plurality of fuel nozzles, not shown, and ignited in an annular combustion zone 50 of the combustor 52. The resulting hot combustion exhaust gases 54 pass through the turbine 16, causing rotation of a turbine rotor 56 and gas generator rotor 12. The combustion exhaust gases 54 continue downstream for further work extraction such as in a power turbine, not illustrated herein, powering and rotating an output power shaft 48 or as exhaust gas through an exhaust nozzle, also not illustrated herein. Power turbines and exhaust nozzles are conventionally known.

Figure 2:
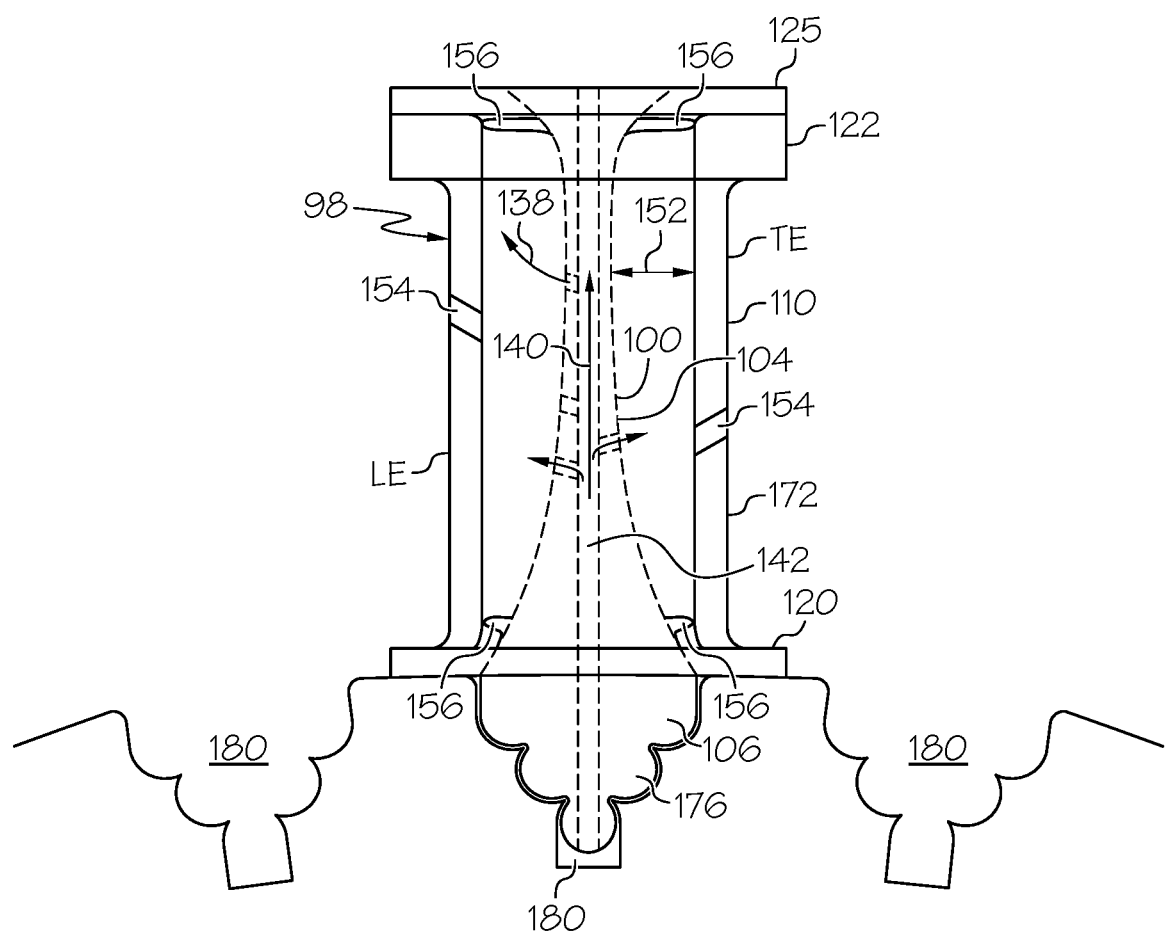
FIG. 2 is a forward looking aft diagrammatical view illustration of the blade mounted in a rim of a disk of the gas generator illustrated in FIG. 1.

Referring to FIGS. 1 and 2, the exemplary embodiment of the turbine 16 illustrated herein includes the turbine rotor first stage disk 60 and a forward shaft 64 connects the turbine rotor 56 in rotational driving engagement to the compressor 14. Turbine stator 58 includes a first stage nozzle 66 upstream of the first stage disk 60. First stage turbine blades 172 are mounted in a first stage rim 168 of the first stage disk 60. The first stage turbine blades 172 extend radially across a turbine flowpath 42 and include first stage roots 176 disposed in first stage slots 180 extending axially through the first stage rims 168.

Illustrated in FIGS. 1 and 2 are cooling supply circuits for the turbine 16. Compressor discharge pressure (CDP) air 76 from the compressor 14 is flowed around a combustor heat shield 46 surrounding the combustion zone 50 and is utilized to cool components of turbine 16 subjected to the hot combustion exhaust gases 54, namely, the first stage nozzle 66 and the first stage disk 60. First stage nozzle cooling air 77 from the compressor 14 directly enters and cools the first stage nozzle 66. First stage disk cooling air 79 may be bled from the compressor 14, and a source 81 of the disk cooling air 79 may be the same as the compressor discharge pressure (CDP) air 76. The first stage disk cooling air 79 is channeled through an annular duct 74 radially inwardly into an annular manifold 88 which is in flow communication with a tangential flow accelerator 90. The accelerator 90 discharges the first stage disk cooling air 79 into a first stage disk forward cavity 92 at a high tangential speed approaching wheelspeed of the first stage disk 60 at a radial position of the accelerator 90.

The first stage disk 60 includes a first stage web 160 extending radially outwardly from a first stage bore 164 to a first stage rim 168. The first stage turbine blades 172 extend radially across a turbine flowpath 42 and include first stage roots 176 disposed in first stage slots 180 extending axially through the first stage rims 168. An annular first stage forward cooling plate 85, mounted to, upstream of, and proximate to the first stage web 160 of the first stage disk 60, defines in part, a cooling airflow path 63 to the first stage slots 180 between the forward cooling plate 85 and the first stage web 160 of the first stage disk 60. An outer rim 23 of the forward cooling plate 85 helps axially retain the first stage roots 176 of the first stage turbine blades 172 in the first stage slots 180. Cooling air 140 from the cooling airflow path 63 flows to the slots 180 and through an internal cooling air flow path 142 through the support 100.

The turbine blade 172 includes an internal structural support 100 radially supporting an aerodynamic fairing 98. The cooling air 140 from the cooling airflow path 63 flows from the slots 180 through an internal cooling air flow path 142 through the support 100. The support 100 includes a strut 104 radially extending away from a support root 106 such as the first stage roots 176. Two possible shapes for the roots 106 are dovetail and firtree, firtree being illustrated herein. The roots 106 are received within the slots 180 thus securing the turbine blade 172 to the disk 60. The turbine blade 172 disclosed herein may be internally cooled with cooling air 140 from a cooling airflow path 63 to the slots 180 and through an internal cooling air flow path 142 extending radially through the support 100. The internal cooling air flow path 142 is illustrated herein as a straight cooling flow path but it may be another type of circuit such as a serpentine flow path.

Figure 3:
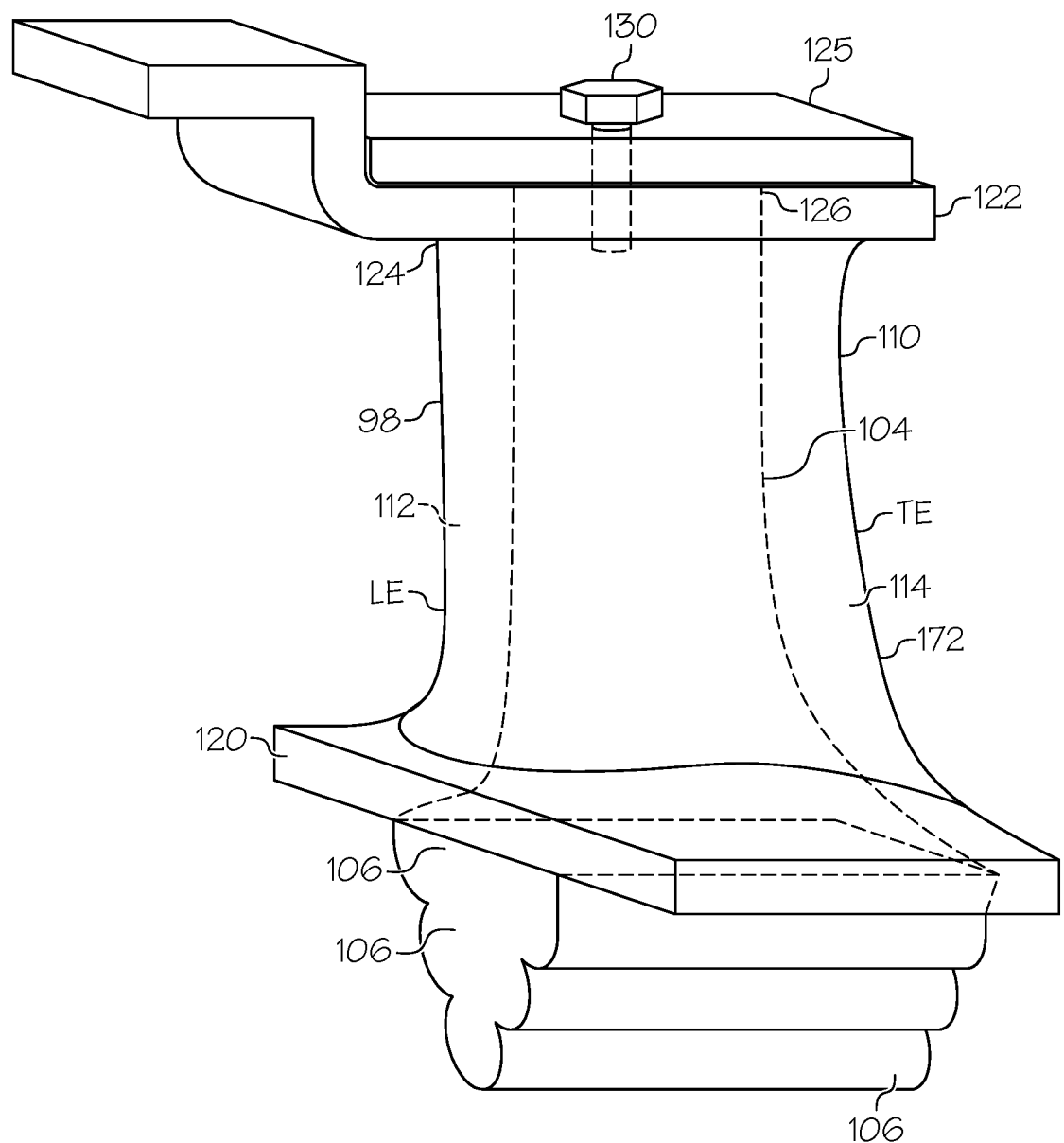
FIG. 3 is an enlarged cutaway perspective view schematical illustration of the blade illustrated in FIG. 1.
Figure 4:
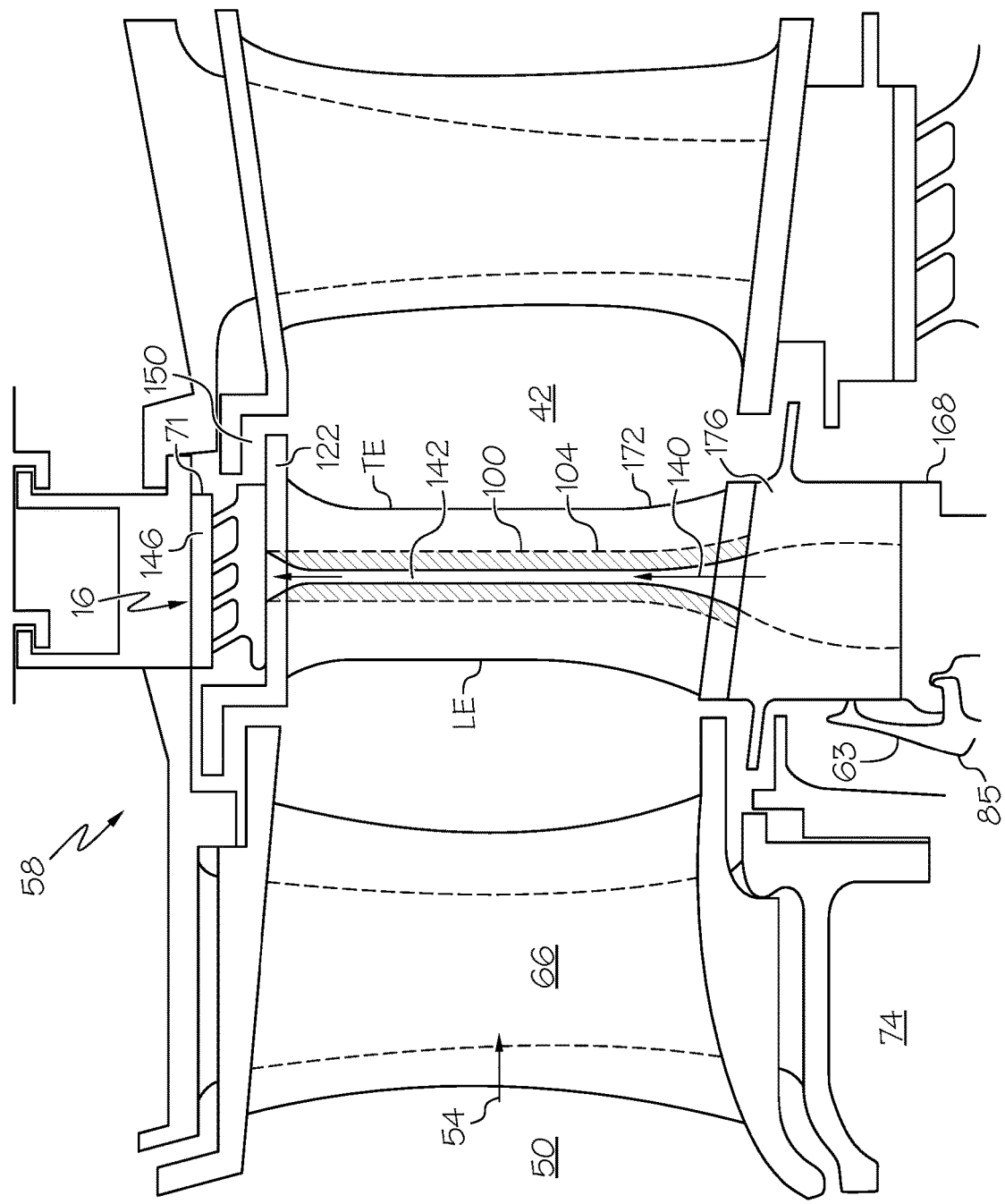
FIG. 4 is a side view illustration of the blade in the gas generator illustrated in FIG. 1.

Referring to FIGS. 2-4, the aerodynamic fairing 98 includes a hollow fairing airfoil 110 surrounding the strut 104 and having pressure and suction sides 112, 114 extending axially between leading and trailing edges LE, TE. The aerodynamic fairing 98 is radially inwardly supported and restrained by the root 106. The fairing airfoil 110 extends radially outwardly from a fairing platform 120 to a blade tip shroud 122 at a tip 124 of the fairing airfoil 110. Circumferentially adjacent fairing platforms 120 of circumferentially adjacent fairings 98 abut. Circumferentially adjacent blade tip shrouds 122 of circumferentially adjacent fairings 98 abut. A support cap 125 is attached to a radially outer end 126 of the strut 104 and is located radially outwardly of and radially outwardly restrains the aerodynamic fairing 98.

Figure 6:
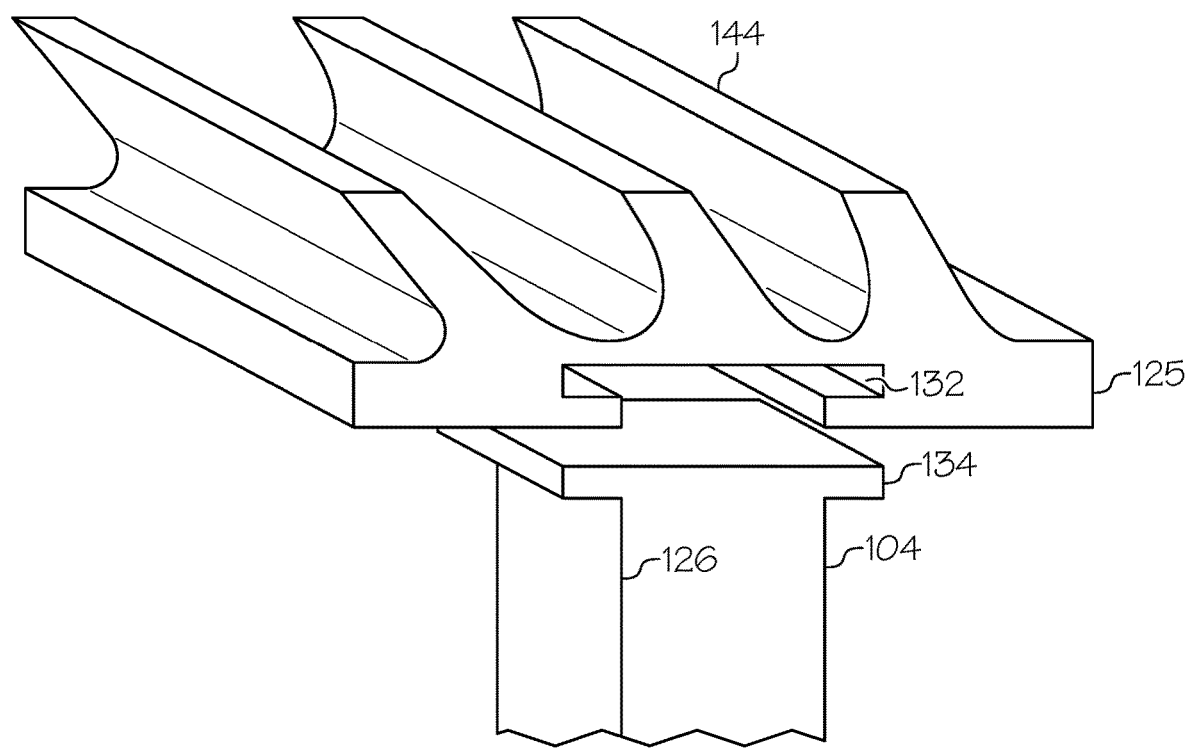
FIG. 6 is a perspective view illustration of a cap attached to the support by a T-slot and T-rail for the blade illustrated in FIG. 4.

The fairing airfoil 110 extends radially outwardly from the fairing platform 120 to the blade tip shroud 122 at the tip 124 of the fairing airfoil 110. A bolt 130 may be used to attach the support cap 125 to the outer end 126 of the strut 104 as illustrated in FIG. 4. Alternatively, the support cap 125 may be welded or bonded to the outer end 126 of the strut 104. A T-slot 132 and T-rail 134 received within the T-slot may be used to attach the support cap 125 to the outer end 126 of the strut 104 as illustrated in FIG. 6.

The blade tip shroud 122 reduces tip leakage and, thus, increases engine performance. To reduce the rotating mass, the aerodynamic fairing 98 including the fairing platform 120, the tip shroud 122, and the fairing airfoil 110 therebetween can be made of a lighter weight material than the support 100. An exemplary material for the aerodynamic fairing 98 is a ceramic matrix composite and the support 100 may be made from a metallic material. The turbine blade 172 disclosed herein may be internally cooled with cooling air 140 from the cooling airflow path 63 to the slots 180 and through an internal cooling air flow path 142 through the support 100.

Referring to FIG. 2, the turbine blade 172 may include a gap 152 between the fairing airfoil 110 of the aerodynamic fairing 98 and the surrounding strut 104 of the support 100. A film cooling portion 138 of the cooling air 140 may be flowed from inside the strut 104, or another part of the support 100, into the gap 152 then through film cooling holes 154 disposed through the airfoil fairing airfoil 110 (if needed). Locator tabs 156 may be included on the support 100, such as on the strut 104, to keep the fairing airfoil 110 from shifting, vibrating, and rotating about the support 100. The majority of the motion will be handled by the centripetal forces but the tabs may still be required to keep it in a pre-determined location. Three tabs 156 should be used on top and three tabs 156 should be used on bottom of the strut 104.

Figure 5:
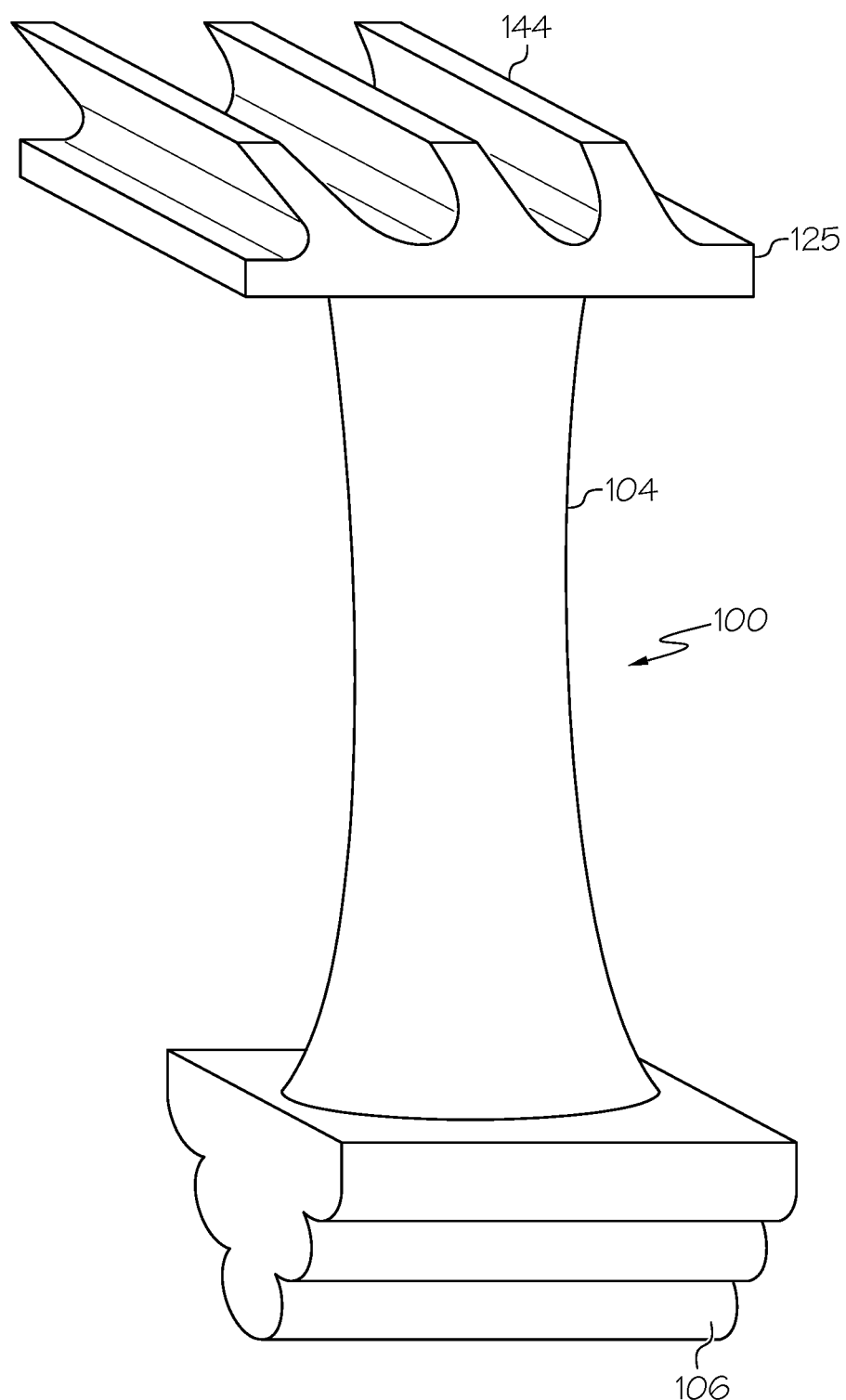
FIG. 5 is a perspective view illustration of the internal support illustrated in FIG. 3.

Referring to FIGS. 4 and 5, the support 100 may include seal teeth 144 extending radially outwardly from the support cap 125 at the top of the structural support 100 to minimize cold-side leakage. The seal teeth 144, illustrated herein as but not limited to labyrinth seal teeth, seals against a seal land 146 in a manner well known in the industry. The support 100 may be configured to allow the cooling air 140 to cool the blade tip shroud 122. The cooling air 140 may also be used for purging shroud cavities 150 to keeping hot flowpath air or combustion exhaust gases 54 in the turbine flowpath 42 from entering the shroud cavities 150. The turbine blade 172 disclosed herein may be used with or without an internal cooling air flow path 142 and may be used in other than first stage high pressure turbines.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A blade for a gas turbine engine having an axis of rotation, the blade comprising:
   an internal structural support including a root;
   a strut radially extending away from the root of the internal structural support to a radially outer end, relative to the axis of rotation, with the strut including a set of openings;
   an aerodynamic fairing radially supported by the internal structural support relative to the axis of rotation, with the aerodynamic fairing including a hollow fairing airfoil surrounding the strut and including a tip, and where the aerodynamic fairing extends radially outwardly from a fairing platform to a blade tip shroud at the tip of the fairing airfoil;
   an internal cooling air flow path extending radially through the strut, passing through the fairing platform, with the internal cooling air flow path having a converging portion; and
   a support cap coupled to the strut at the radially outer end of the strut to radially outwardly restrain the aerodynamic fairing;
   wherein the root radially inwardly restrains the fairing platform.

2. The blade of claim 1, further comprising seal teeth extending radially outwardly from the support cap.

3. The blade of claim 1, further comprising the aerodynamic fairing and the internal structural support made of fairing and support materials respectively wherein the fairing material is a lighter weight material than the support material.

4. The blade of claim 3, wherein the fairing material is a ceramic matrix composite and the support material is a metallic material.

5. The blade of claim 1, wherein the converging portion of the internal cooling air flow path extends through the fairing platform and the root.

6. The blade of claim 1, wherein the internal cooling air flow path further comprises a diverging portion.

7. The blade of claim 6, wherein the diverging portion of the internal cooling air flow path is located at the tip.

8. A turbine rotor assembly comprising:
   a plurality of blades mounted in a rim of a disk;
   at least one blade of the plurality of blades including an internal structural support at least partially radially supporting an aerodynamic fairing, the internal structural support defining a cooling air flow path extending through the internal structural support;
   a strut radially extending away from a root of the internal structural support, the strut including a set of openings to fluidly couple the cooling air flow path to the interior of the aerodynamic fairing;
   the aerodynamic fairing including a hollow fairing airfoil surrounding the strut, with the fairing airfoil including a set of film cooling holes;
   the aerodynamic fairing further including the fairing airfoil extending radially outwardly from a fairing platform to a blade tip shroud at a tip of the fairing airfoil;
   the root disposed in a slot extending axially through the rim and radially inwardly restraining the fairing platform;
   an internal cooling air flow path extending radially through the strut, passing through fairing platform, with the internal cooling air flow path having a converging portion; and
   a support cap coupled to the strut at a radially outer end of the strut that radially outwardly restrains the aerodynamic fairing.

9. The turbine rotor assembly of claim 8, further comprising an annular forward cooling plate mounted to, upstream of, and proximate to a web of the disk and defining in part a cooling airflow path to the slot.

10. The turbine rotor assembly of claim 9, further comprising the aerodynamic fairing and the internal structural support made of fairing and support materials respectively wherein the fairing material is a lighter weight material than the support material.

11. The turbine rotor assembly of claim 10, wherein the fairing material is a ceramic matrix composite and the support material is a metallic material.

12. The turbine rotor assembly of claim 11, further comprising seal teeth extending radially outwardly from the support cap.

13. The turbine rotor assembly of claim 12, further comprising the internal structural support configured to allow cooling air to pass through the blade and into a shroud cavity for cooling the blade tip shroud.

14. The turbine rotor assembly of claim 10, further comprising seal teeth extending radially outwardly from the support cap.

15. The turbine rotor assembly of claim 9, further comprising seal teeth extending radially outwardly from the support cap.

16. A gas turbine engine gas generator comprising:
a compressor upstream of a turbine, and a combustor disposed therebetween;
a plurality of turbine blades mounted in a rim of a disk of a turbine rotor assembly in the turbine;
at least one of the blades including an internal structural support at least partially radially supporting an aerodynamic fairing;
a strut radially extending away from a root of the internal structural support, the strut including a set of openings;
the aerodynamic fairing including a hollow fairing airfoil surrounding the strut, the aerodynamic fairing further including the hollow fairing airfoil extending radially outwardly from a fairing platform to a blade tip shroud at a tip of the hollow fairing airfoil;
the root disposed in a slot extending axially through the rim and radially inwardly restraining the fairing platform;
an internal cooling air flow path extending radially through the strut, passing through the fairing platform, with the internal cooling air flow path having a diverging portion; and
a support cap coupled to the strut at a radially outer end of the strut that radially outwardly restrains the aerodynamic fairing.

17. The gas turbine engine gas generator of claim 16, further comprising:
an annular forward cooling plate mounted to, upstream of, and proximate to a web of the disk and defining in part a cooling airflow path to the slot;
the cooling airflow path in flow communication with a source of disk cooling air in the compressor; and
an internal cooling air flow path extending radially through the internal structural support from the slot.

18. The gas turbine engine gas generator of claim 17, further comprising the aerodynamic fairing and the internal structural support made of fairing and support materials respectively wherein the fairing material is a lighter weight material than the support material.

19. The gas turbine engine gas generator of claim 18, wherein the fairing material is a ceramic matrix composite and the support material is a metallic material.

20. The gas turbine engine gas generator of claim 19, further comprising seal teeth extending radially outwardly from the support cap.

* * * * *